United States Patent
Morse et al.

(10) Patent No.: US 7,234,874 B2
(45) Date of Patent: Jun. 26, 2007

(54) OPTICAL CONNECTOR ADAPTER FOR CONNECTING OPTICAL PUMP SOURCES TO OPTICAL WAVEGUIDES AND METHOD OF FORMING SAME

(75) Inventors: Randall K. Morse, Palm Bay, FL (US); Robert J. Licciardi, Melbourne, FL (US); Donald M. Ball, Palm Bay, FL (US); Michael R. Lange, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 366 days.

(21) Appl. No.: 10/718,908

(22) Filed: Nov. 21, 2003

(65) Prior Publication Data

US 2004/0105628 A1 Jun. 3, 2004

Related U.S. Application Data

(63) Continuation-in-part of application No. 09/988,906, filed on Nov. 20, 2001, now Pat. No. 6,905,256.

(51) Int. Cl.
*G02B 6/36* (2006.01)
(52) U.S. Cl. .............................. 385/53; 385/39; 385/89
(58) Field of Classification Search ...................... None
See application file for complete search history.

(56) References Cited

U.S. PATENT DOCUMENTS

| | | | | |
|---|---|---|---|---|
| 5,042,709 A | | 8/1991 | Cina et al. | 228/105 |
| 5,337,398 A | | 8/1994 | Benzoni et al. | 385/90 |
| 5,625,767 A | * | 4/1997 | Bartell et al. | 345/440 |
| 5,729,641 A | | 3/1998 | Chandonnet et al. | 385/2 |
| 5,774,614 A | | 6/1998 | Gilliland et al. | 385/88 |
| 5,815,308 A | * | 9/1998 | Kim et al. | 359/341.2 |
| 6,056,448 A | | 5/2000 | Sauter et al. | 385/92 |
| 6,068,410 A | | 5/2000 | Giebel et al. | 385/72 |
| 6,085,003 A | | 7/2000 | Knight | 385/59 |
| 6,130,977 A | | 10/2000 | Rosson | 385/76 |
| 6,168,317 B1 | | 1/2001 | Shahid | 385/71 |
| 6,206,579 B1 | | 3/2001 | Selfridge et al. | 385/60 |
| 6,227,718 B1 | * | 5/2001 | Harvey et al. | 385/55 |
| 6,249,627 B1 | | 6/2001 | Bond et al. | 385/49 |
| 6,331,081 B1 | * | 12/2001 | Ohtsuka et al. | 385/85 |
| 6,352,372 B1 | * | 3/2002 | Shahid | 385/136 |
| 6,386,767 B1 | * | 5/2002 | Naghski | 385/83 |
| 6,594,420 B1 | | 7/2003 | Lange et al. | 385/36 |
| 6,781,749 B2 | * | 8/2004 | Radic | 359/341.2 |
| 6,853,768 B2 | * | 2/2005 | Kibler et al. | 385/33 |

(Continued)

*Primary Examiner*—Gregory J. Toatley, Jr.
*Assistant Examiner*—Juan D. Valentin, II
(74) *Attorney, Agent, or Firm*—Allen, Dyer, Doppelt, Milbrath & Gilchrist, P.A.

(57) ABSTRACT

An optical connector adapter includes a substrate having optical waveguides for transporting optical signals. The optical connector adapter is for connecting optical pump sources to the optical waveguides using passive alignment. The substrate has opposing ends, a top reference surface and a side reference surface aligned relative to the optical waveguides. A respective carrier bracket is received over each end of the substrate. Respective substrate alignment fiducials align the carrier brackets relative to the substrate. A substrate carrier receives the substrate and carrier brackets. Respective carrier alignment fiducials align the substrate carrier and the carrier brackets. An optical coupler is received on the substrate carrier. A coupler alignment fiducial aligns the optical coupler relative to the substrate so that the optical coupler is aligned relative to the optical waveguides.

43 Claims, 13 Drawing Sheets

U.S. PATENT DOCUMENTS 6,905,257 B2 * 6/2005 Eichenberger et al. ........ 385/89
6,913,400 B2 * 7/2005 O'Toole et al. ............... 385/89
6,955,481 B2 * 10/2005 Colgan et al. ................ 385/89
2002/0126348 A1 9/2002 Lange et al. ................ 359/124

* cited by examiner

OPTICAL CONNECTOR ADAPTER FOR CONNECTING OPTICAL PUMP SOURCES TO OPTICAL WAVEGUIDES AND METHOD OF FORMING SAME

RELATED APPLICATION

The present application is a continuation-in-part of U.S. patent application Ser. No. 09/988,906 filed Nov. 20, 2001 now U.S. Pat. No. 6,905,256, the entire contents of which are incorporated herein by reference.

FIELD OF THE INVENTION

The present invention relates to the field of optics, and in particular, to an optical connector adapter for connecting optical pump sources to single or multi-channel optical waveguides.

BACKGROUND OF THE INVENTION

A major obstacle in the precision connection of optical fibers, MTP connectors and similar devices is the critical alignment of an optical waveguide to its signal input and output and pump sources. This is especially important when various optical components are interfaced to a multi-fiber ribbon when used in conjunction with a single or multichannel waveguide. Current alignment techniques include active alignment and passive alignment.

Active alignment involves pigtailing fibers individually by automated machine vision with motorized stages. For example, a waveguide substrate potentially has a number of channels that are aligned with fibers by actively passing light through the fibers and/or devices to align the fibers. A power meter is typically used to measure the percentage of light passing through the connected device and fiber to assure that the fiber alignment is correct. Once any fiber and connector alignment is determined to be correct, epoxy is applied over the waveguide substrate and fiber to bond and cure the fibers into a set position. This active alignment process is a very labor intensive process, requiring high skill and the use of high precision opto-mechanical alignment systems.

Passive alignment overcomes the drawbacks associated with the active alignment, and is used for connecting MTP multi-fiber connectors and similarly designed optical connector applications. The MTP connector assembly includes a precise multi-fiber array and ferrule and a passive alignment mechanism formed by two guide holes and pins. An example of such a passive alignment MTP connector assembly is disclosed in the technical paper, "MT Multifiber Connectors and New Applications", 44th Electronic Components and Technology Conference, 1994, the disclosure of which is hereby incorporated by reference in its entirety.

A passive alignment accuracy of 2 micrometers has been obtained using this technique. The passive alignment between a multimode 12-fiber ribbon terminated with the MT (or MTP) connector and a vertical cavity surface emitting laser (VCSEL) array giving a 10 micrometer active diameter held a high percentage of coupling efficiency. This allowed a multi-fiber ribbon to a multi-fiber ribbon connection using an intermediate connector as described.

Another problem arises when multi-fiber ribbons are used in applications requiring amplification of the optical signals being transported by the fibers, such as in long haul non-regenerative repeaters. To amplify the optical signals, it is necessary to break out each individual fiber from the multi-fiber ribbon. This is a very labor intensive process.

One approach for avoiding this process is disclosed in U.S. Pat. No. 6,594,420 to Lange et al., which is assigned to the current assignee of the present invention and is incorporated herein by reference in its entirety. In Lange et al., optical waveguides are optically coupled to an array of optical pump sources through an optical coupler. However, Lange et al. fails to disclose in any detail how the optical coupler is aligned with the optical waveguides. Instead, Lange et al. simply discloses that the optical coupler is arranged immediately adjacent an upper surface of the optical waveguides.

SUMMARY OF THE INVENTION

In view of the foregoing background, an object of the present invention is to provide an optical connector adapter that passively aligns optical pump sources to single or multi-channel optical waveguides.

This and other objects, advantages and features in accordance with the present invention are provided by an optical connector adapter comprising a substrate including at least one optical waveguide for transporting optical signals, with the substrate having opposing ends, and a top reference surface and a side reference surface aligned relative to the at least one optical waveguide. A respective carrier bracket may be received over each end of the substrate, and respective substrate alignment fiducials align the carrier brackets relative to the substrate.

The optical connector adapter may comprise a substrate carrier that receives the substrate and carrier brackets. Respective carrier alignment fiducials may be used for aligning the substrate carrier and the carrier brackets. An optical coupler may be received on the substrate carrier. At least one coupler alignment fiducial may be used for aligning the optical coupler relative to the substrate so that the optical coupler is aligned relative to the at least one optical waveguide.

The optical connector adapter advantageously uses the top and side reference surfaces of the substrate along with the various alignment fiducials to create data points as reference surfaces. The reference surfaces allow the optical waveguides within the optical connector adapter to be passively aligned with the optical input/output signals from waveguide devices and from corresponding optical pump sources.

The various alignment fiducials may include the following, for example. Each substrate alignment fiducial may comprise an alignment pin at an edge defined by the top and side reference surfaces, and the alignment pin is positioned within a corresponding guide hole in the carrier bracket. Each carrier alignment fiducial may comprise an alignment pin extending outwardly from the carrier bracket, and it is positioned within a corresponding guide hole in the substrate carrier. The at least one coupler alignment fiducial may be a side surface extension extending from the optical coupler, and the alignment extension may be in contact with the side reference surface of the substrate.

In addition to the various alignment fiducials, the top reference surface and the side reference surface may be formed as high precision surfaces, with the side reference surface being orthogonal to the top reference surface. The other surfaces, i.e., the other side, bottom and end surfaces, can be formed as lower tolerance surfaces. This saves manufacturing costs.

The substrate may comprise a substrate holder having at least one groove formed within the top reference surface for receiving the at least one optical waveguide. The at least one optical waveguide preferably comprises an optical fiber. The optical fiber comprises a core surrounded by cladding, and the core preferably comprises doped erbium ytterbium phosphate glass. The substrate holder may comprise at least one of silicon, glass, a molded silica resin composite and a ceramic.

In other embodiments, the substrate may comprise a waveguide substrate, with each optical waveguide being implanted within the top reference surface of the substrate. Alternately, the substrate may comprise a semiconductor waveguide substrate, with the at least one optical waveguide comprising silica deposited on the top reference surface of the substrate.

The optical coupler may comprise at least one input for receiving optical signals (from an optical pump source) from a direction that is generally traverse with respect to each optical waveguide. In one embodiment, the optical coupler may comprise a prism and an array of diffractive optic elements on a surface of the prism for focusing the optical signals into each respective optical waveguide. In another embodiment, the optical coupler may comprise an array of lenslets for focusing the optical signals into each respective optical waveguide. In yet another embodiment, the optical coupler may comprise a GRIN lens for focusing the optical signals into each respective optical waveguide.

Another aspect of the present invention is directed to a method of forming an optical connector adapter as defined above. In particular, the method preferably comprises forming a substrate comprising at least one optical waveguide for transporting optical signals, wherein the substrate has opposing ends, and a top reference surface and a side reference surface aligned relative to the at least one optical waveguide.

The method further comprises positioning a respective carrier bracket over each end of the substrate and aligning the carrier brackets relative to the substrate using respective substrate alignment fiducials. The substrate having the carrier brackets thereon is inserted into a substrate carrier, and the substrate carrier and the carrier brackets are aligned using respective carrier alignment fiducials. The method may further comprises positioning an optical coupler on the substrate carrier and aligning the optical coupler relative to the substrate using at least one coupler alignment fiducial so that the optical coupler is aligned relative to the at least one optical waveguide.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout and prime, double prime and triple prime notations are used to indicate similar elements in alternate embodiments.

Figure 1:
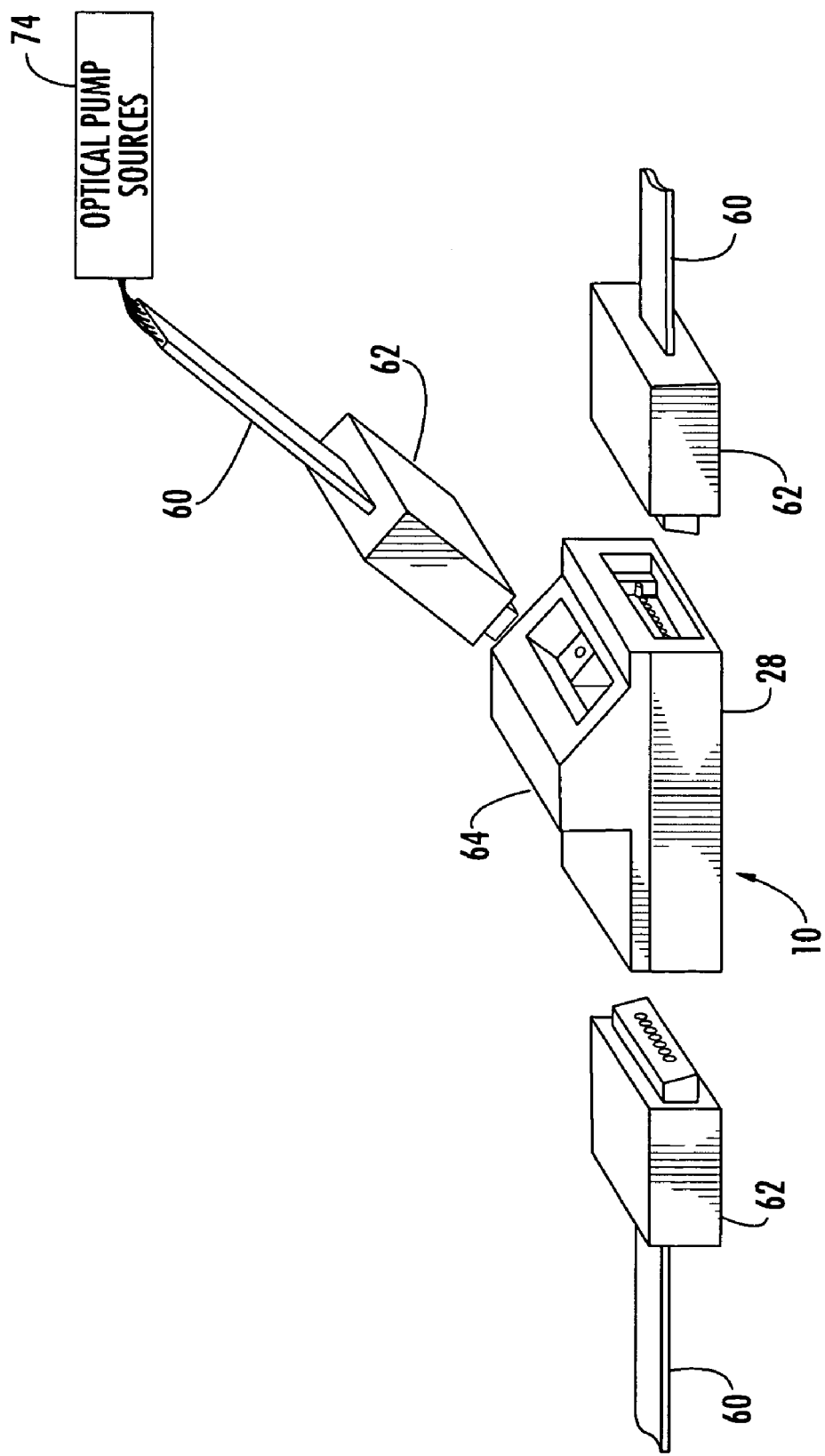
FIG. 1 is a perspective view of the optical connector adapter in accordance with the present invention along with optical pump sources and waveguide devices to be connected thereto.

Referring initially to FIG. 1, the optical connector adapter 10 in accordance with the present invention comprises a substrate carrier 28 for carrying a substrate comprising optical waveguides for transporting optical signals. The optical connector adapter 10 interfaces the optical waveguides to fiber 60 by allowing passive alignment. As illustrated in FIG. 1, the waveguide devices may be MTP connectors 62 and the fiber 60 may be ribbon fiber.

The optical connector adapter 10 comprises an optical coupler 64 that is received on the substrate carrier 28. Passive alignment is also used for connecting an array of optical pump sources 74 to the optical waveguides so that the optical signals being transported therethrough are amplified. The optical pump sources 74 provide optical signals to the optical coupler 64 via fiber 60 and another MTP connector 62.

As will be discussed in greater detail below, the optical connector adapter 10 uses alignment fiducials to create data points as reference surfaces. The reference surfaces advantageously allow the optical waveguides within the optical connector adapter 10 to be passively aligned with the optical input/output signals from the waveguide devices 62 and with the corresponding optical pump sources 74.

Figure 2:
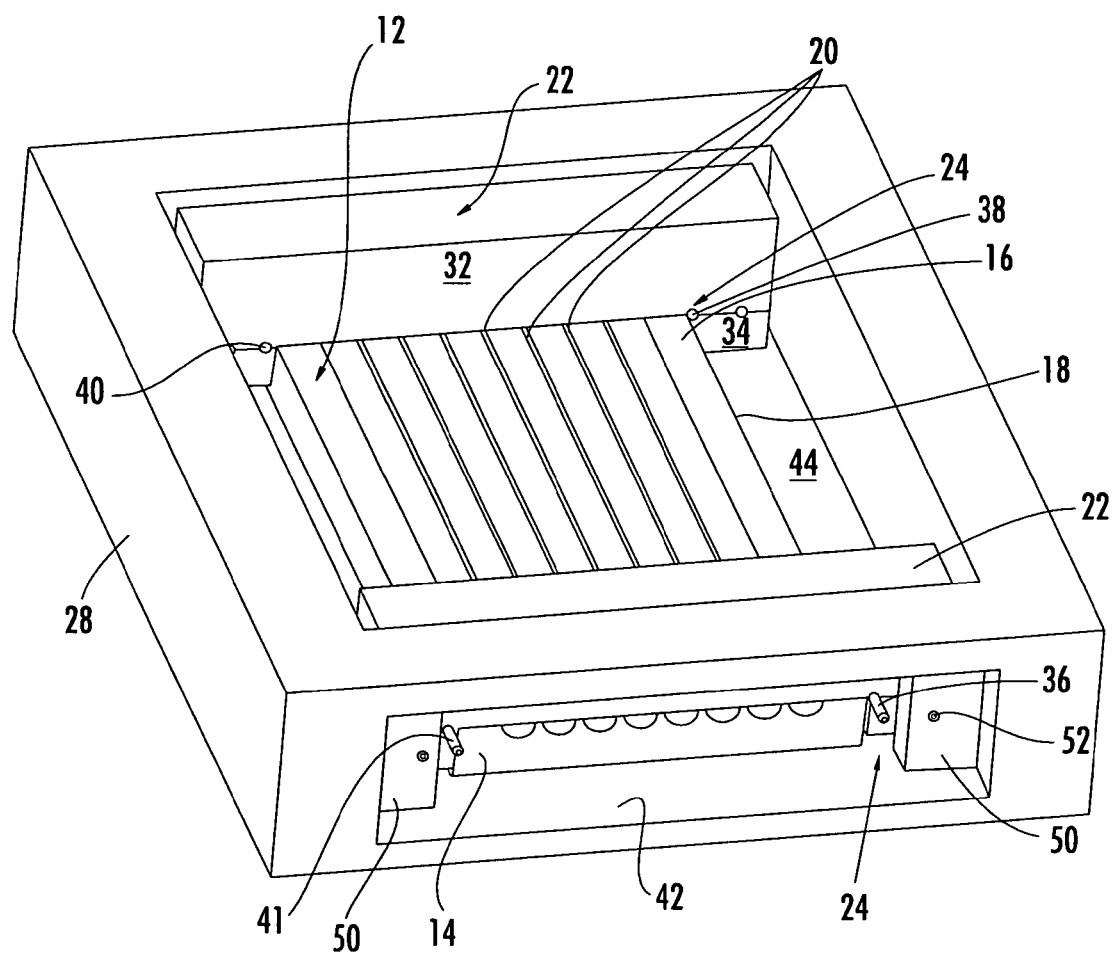
FIG. 2 is a perspective view of the substrate carrier with the carrier subassembly positioned therein as shown in FIG. 1.
Figure 3:
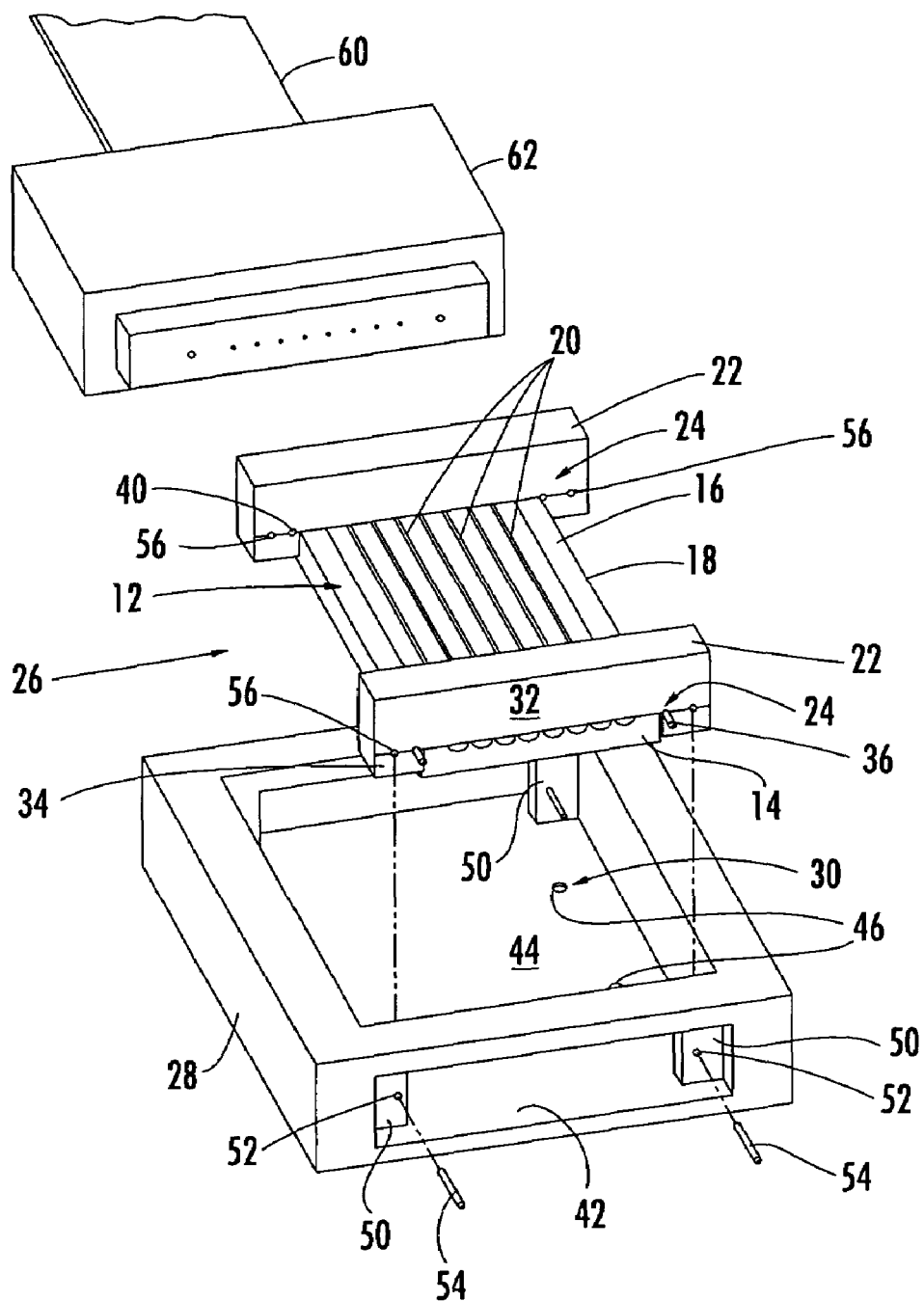
FIG. 3 is an exploded isometric view of the substrate carrier illustrated in FIG. 2 with the carrier subassembly removed therefrom.

Referring now to FIGS. 2 and 3, the basic elements of the optical connector adapter 10 comprise a substrate 12 having opposing ends 14 similarly formed to each other, a high precision top reference surface 16 and a high precision side reference surface 18 that is orthogonal to the top reference surface. In a preferred aspect of the invention only one high precision side reference surface 18 is formed. This saves manufacturing costs because only two, high precision reference surfaces are formed (i.e., the top and side reference surfaces 16, 18), while other surfaces, i.e., the other side, bottom and end surfaces, can be formed as lower tolerance surfaces. Both of the high precision reference surfaces 16, 18 may be formed by various techniques depending on the type of substrate used.

Figure 4A:
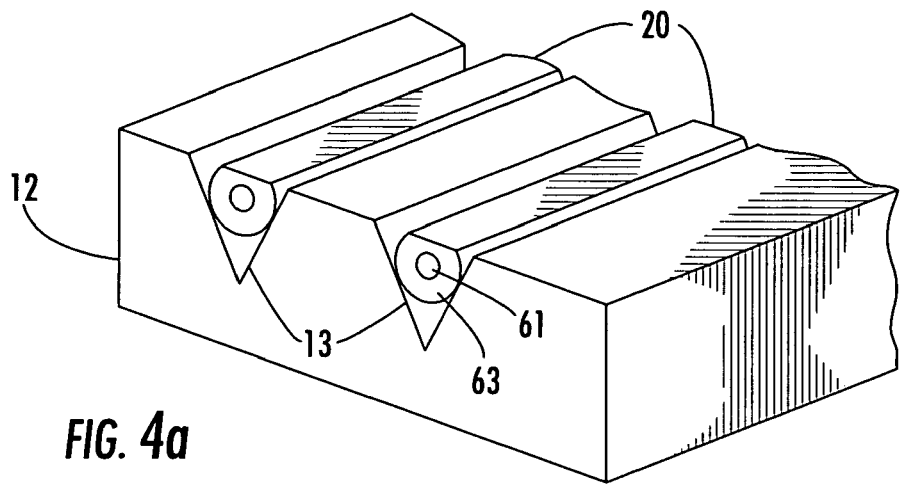
FIGS. 4a, 4b and 4c are enlarged isometric views illustrating different embodiments of the substrate and optical waveguides in accordance with the present invention.

The different types of substrates will now be discussed with reference to FIGS. 4a-4c. The substrate is formed for transporting optical signals and could be formed as a substrate holder 12 having a plurality of precision grooves 13 formed within the top reference surface and defined by semiconductor masking techniques, as illustrated in FIG. 4a. The substrate holder 12 could be formed from one of silicon or glass. The substrate holder 12 could also be formed from a molded silica resin composite or ceramic.

Figure 4B:
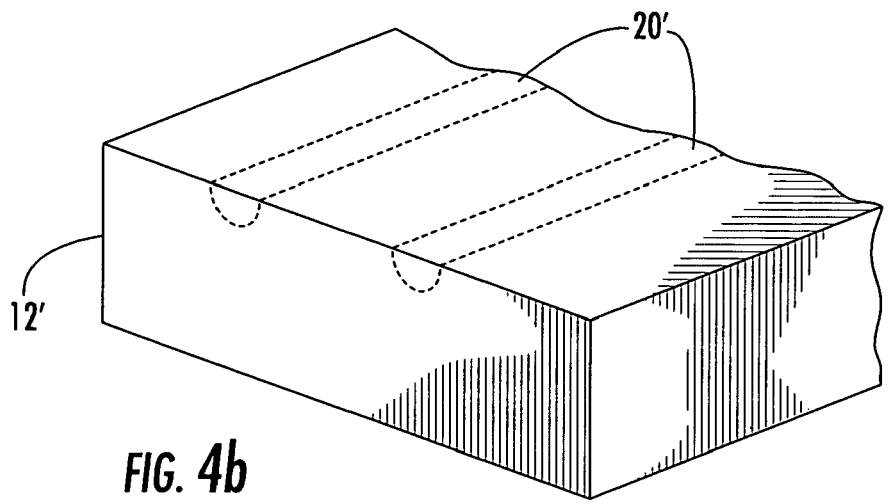
Figure 4C:
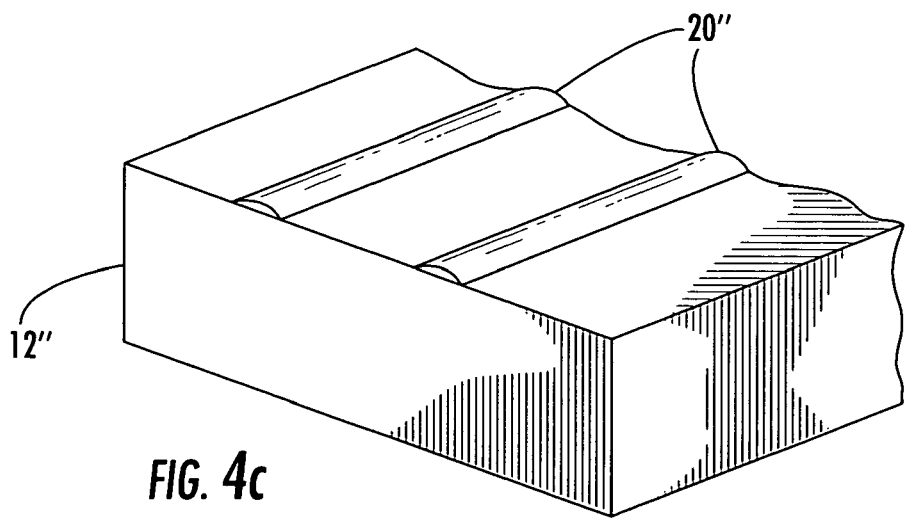

In other embodiments, the substrate comprises a waveguide substrate 12' having waveguides 20' implanted within the top reference surface and defined by precision semiconductor masking, as illustrated in FIG. 4b. The substrate could also be formed as a semiconductor waveguide substrate 12" having silica waveguides 20" deposited on the top reference surface and defined by precision semiconductor masking, as illustrated in FIG. 4c.

Referring back to FIG. 4a, the optical waveguides 20 for the substrate 12 are formed by optical fibers positioned within the grooves 13. Each fiber comprises a central core 61 through which an optical signal from an upstream ribbon fiber propagates, and an adjacent cladding layer 63, that partially surrounds core.

The core 61 is dimensioned to have a cross section that may nominally conform with that of an associated ribbon fiber 60. The core 61 serves as the principal signal transport medium and amplifying medium through the optical connector adapter 10.

The core 61 may comprise an optically transmissive material whose photonically stimulated, energy state transfer properties readily absorb optical energy supplied by an associated one or more light amplification pumping sources 74 (such as optical pumping sources that emit a nominal 980 nm optical beam) and provide emitted radiation-stimulated amplification of the (nominal 1550 nm) optical beam.

As a non-limiting example of a suitable material, the core 61 may comprise erbium ytterbium-doped phosphate glass (e.g., phosphate glass containing 22% $Yb^{3+}$ and 2.2% $Er^{3+}$). The cladding 63 may comprise a like or similar glass material to the core 61, but undoped, and having a slightly lower index of refraction. The cladding 63 serves to both improve the focusing tolerance window upon which one or more pumping optical energy beams are imaged for amplifying the optical signal propagating in the core 61, and to allow an increase in power density (watts/cm$^2$) of the incident pumping source beam along the gain interaction length of the amplifying core.

Such a core structure may be formed by a controlled implantation of Ag ions through a metalized masked planar glass surface, or pulled into a fiber from a multiple clad preform of phosphate glass, to form a clad and a core region having an elevated optical index with Yb/Er dopant concentration in the core. It may be noted that where pumping source focusing optics accommodate very narrow imaging tolerances which can be confined within the dimensional parameters of the core 61, the cladding 63 may be dispensed with.

The substrate 12 is illustrated in greater detail in FIGS. 8-11. To provide accurately aligned, placement of each of the optical waveguides 20 in the substrate 12, so that their center-to-center spacing matches the center-to-center spacings of the optical fibers 60 of a multi-fiber ribbon, a plurality of spatially adjacent (e.g., parallel) grooves 13 may be patterned (e.g., etched) in the top reference surface 16 of the substrate 12 in spatial alignment with the required separation pattern. The grooves 13 are sized to receive respective ones of the clad core-configured optical fibers 20, which may be affixed in the grooves by a suitable epoxy.

The substrate 12 is substantially rectangular configured and has opposing ends 14. Through preferred molding, semiconductor masking and photolithography techniques or other techniques known to those skilled in the art, the top reference surface 16 and the side reference surface 18 are formed substantially orthogonal to each other. These reference surfaces 16, 18 are the only two critical reference surfaces required for the present invention, with each surface having a very high surface precision relative to each other.

Through techniques known to those skilled in the art, the plurality of optical fiber receiving channels 13, or grooves, are formed on the top reference surface 16 and optical fiber 20 is received therein, such as single mode fiber having an optical core of less than about 9 microns or multimode fiber. Naturally, the fiber is larger, such as 125 microns, with some single mode fiber. Multimode fiber can have cores of about 50 or 62.5 microns diameter. Thus, because the channels or grooves 13 have been formed to have precise distance from the side reference surface 18, any received optical fiber 20 is spaced a predetermined distance from the side reference surface 18.

Figure 11:
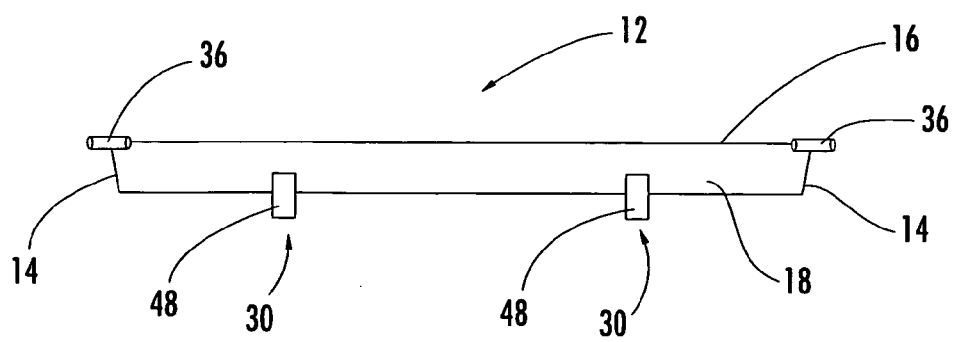
FIG. 11 is a side elevation view of the substrate illustrated in FIG. 8.
Figure 12:
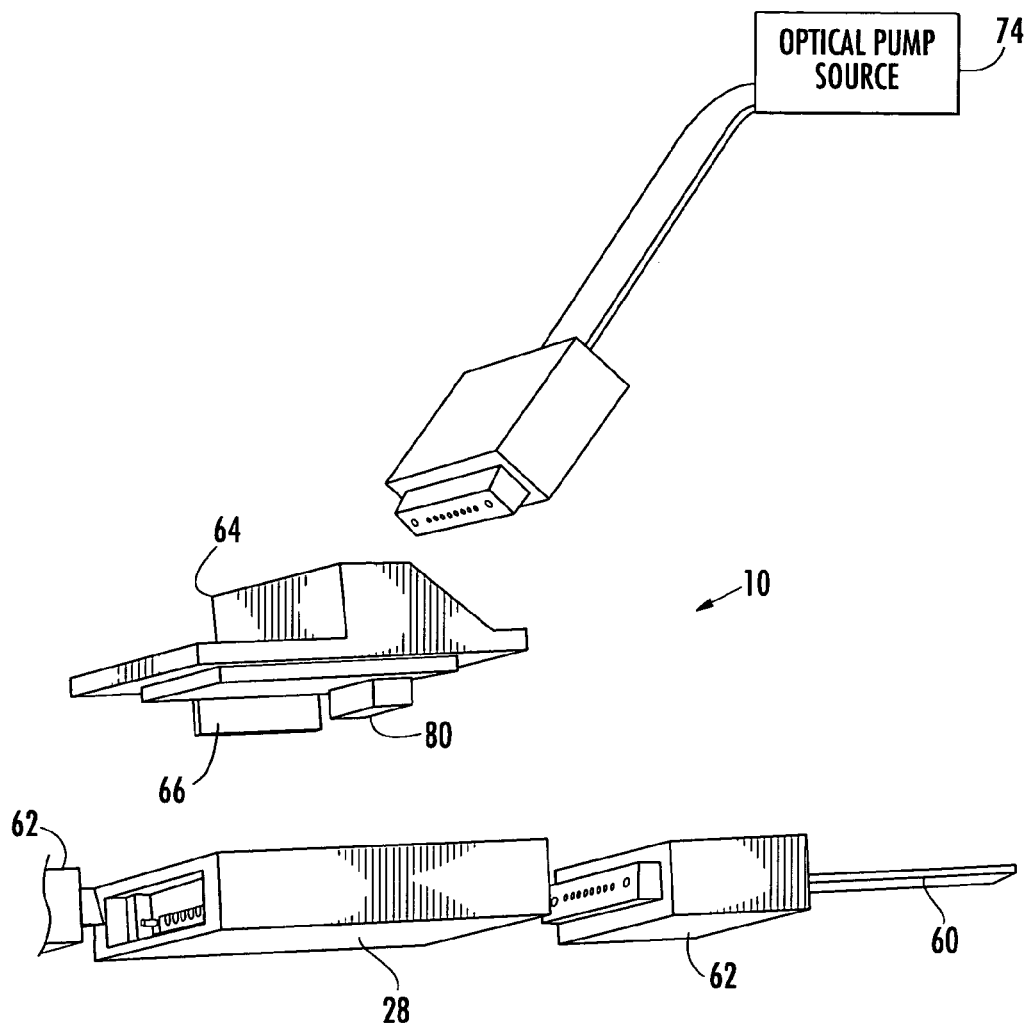
FIG. 12 is an exploded isometric view of the optical connector adapter as shown in FIG. 1.
Figure 13:
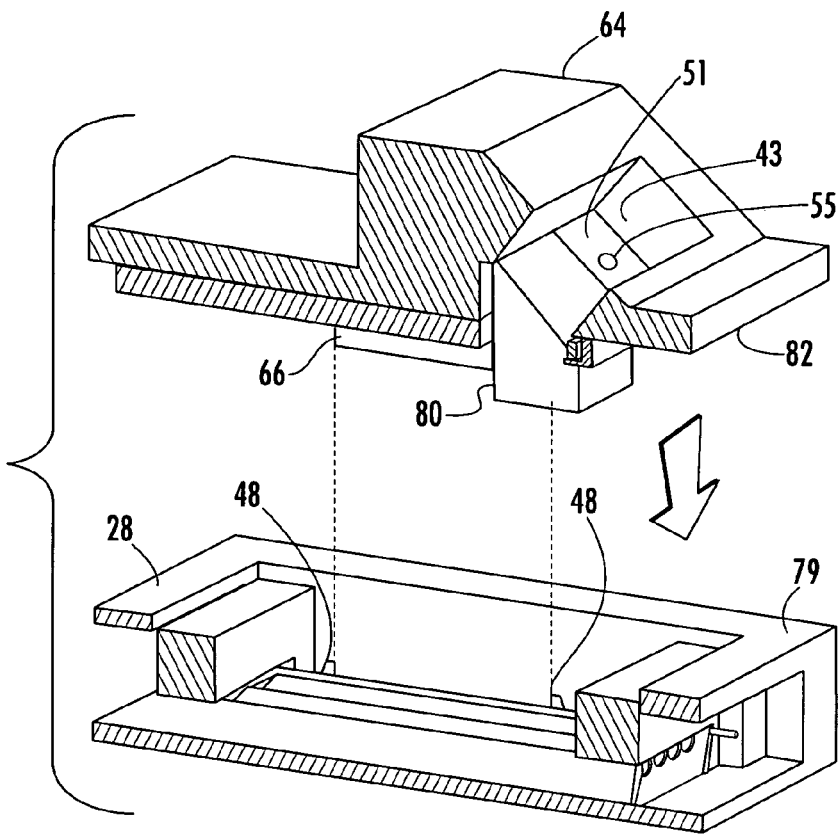
FIG. 13 is a cutaway exploded isometric view of the optical coupler separated from the substrate carrier as shown in FIG. 12.
Figure 14:
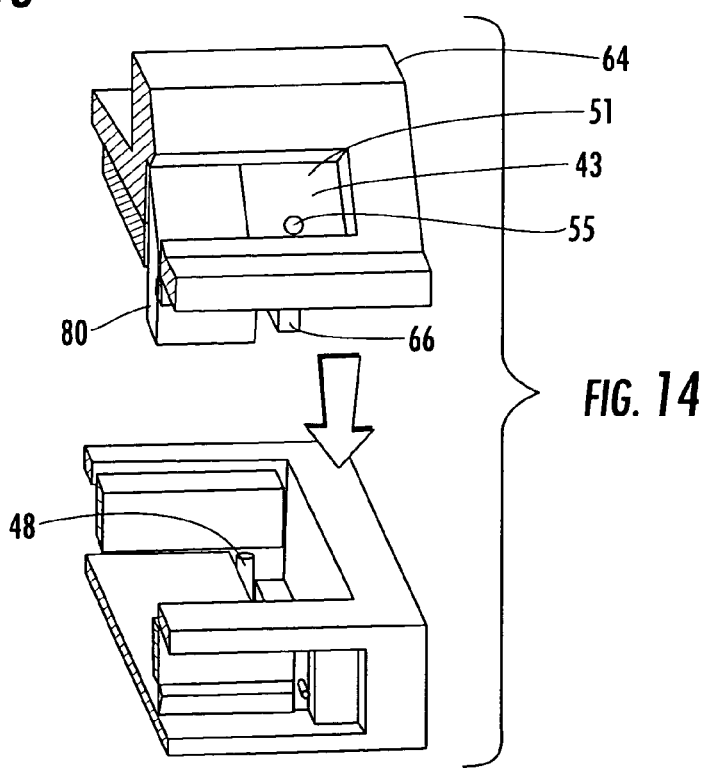
FIG. 14 is another cutaway exploded isometric view of the optical coupler separated from the substrate carrier as shown in FIG. 12.

The ends 14 of the substrate 12 can include an angled surface as illustrated in FIG. 11 for connecting single mode fiber or a flat surface (not illustrated) for connecting multi-mode fiber, as known to those skilled in the art. Although any number of optical fiber receiving channels or grooves 13 can be formed on the top reference surface 16, typically 1, 2, 4, 8, 12, 16 or 24 channels are formed for connecting to the industry common 1, 2, 4, 8, 12, 16 or 24 channel devices. As readily appreciated by those skilled in the art, the optical connector adapter 10 in accordance with the present invention is also applicable to a substrate having a single waveguide channel.

Typically, with single mode fiber, the waveguide optical core 61 is about 9 microns and can be spaced about 250 microns from center-to-center. In one aspect of the present invention, the waveguide substrate 12 could be injection molded, or it could be formed by other manufacturing techniques known to those skilled in the art.

Formation of the substrate 12 in accordance with the present invention will now be discussed in greater detail. As noted above, the substrate 12 has opposing ends, and a top reference surface 16 and a side reference surface 18 aligned relative to the optical waveguides 20. The top reference surface 16 of the substrate 12 may be formed as a precision polished, optically flat reference surface and the side reference surface 18 may be formed as a lithographically defined and formed precision reference surface. The substrate 12 could be a molded substrate having a precision molded top and side reference surface. For example, the top reference surface 16 is polished optically flat within nanometers of flatness, and the side reference surface 18 is then lithographically defined. A mask can be placed on top of the polished substrate 12 and alignment marks or fiducials are formed by the mask.

A technician creating the substrate 12 grinds off or polishes back to that mark or fiducial to create the precision side reference surface 18. Thus, it is lithographically defined on top and polished back at the side surface to the fiducials. Alignment pins as described below could be used when the substrate 12 is a molded piece, whether thermoset plastic, silica resin or ceramic.

After the substrate 12 has been formed to include the optical waveguides 20, a carrier bracket 22 is received over the top reference surface 16 at either end 14 and includes substrate alignment fiducials 24 that align the top and side reference surfaces 16, 18 of the waveguide substrate 12 relative to the carrier bracket 22. The waveguide substrate 12 and attached carrier brackets 22 form a carrier subassembly 26 that is received within a substrate carrier 28, also having carrier alignment fiducials for aligning the side reference surface 18 and top reference surface 16 relative to the substrate carrier, and thus, allowing an aligned connection of any optical fiber 20 received within the grooves 13 on the top reference surface 16 with a waveguide device 62 connected thereto, as further explained below.

Figure 5:
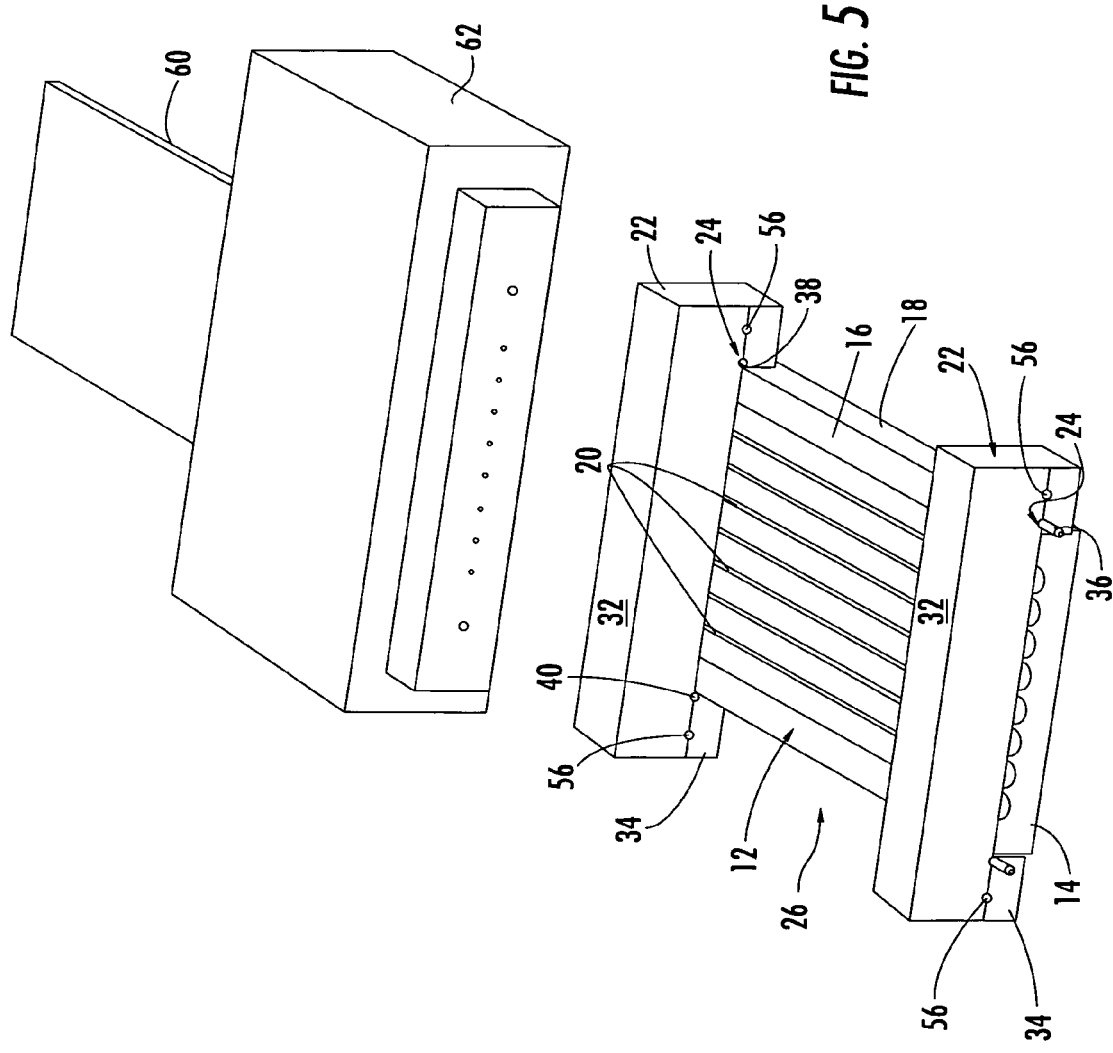
FIG. 5 is an isometric view of the carrier subassembly as shown in FIG. 2.
Figure 6:
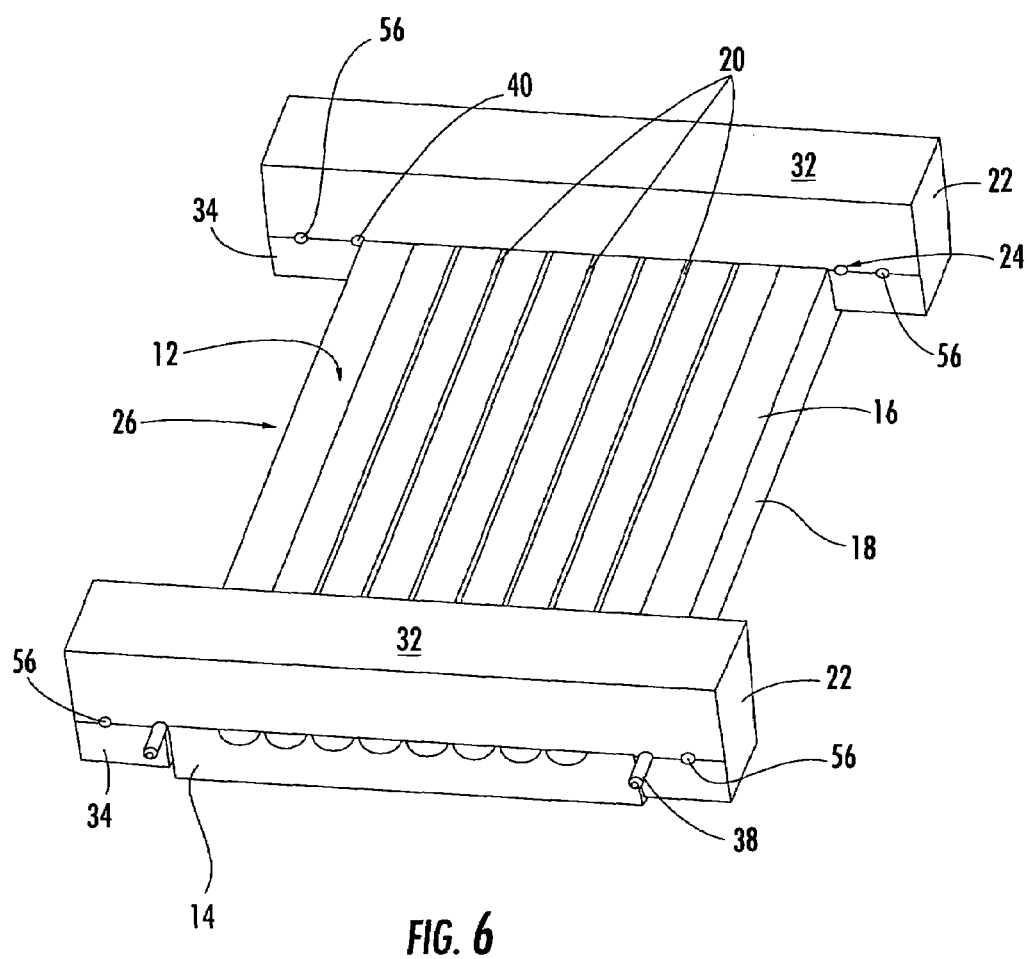
FIG. 6 is another isometric view of the carrier subassembly as shown in FIG. 5.

As more clearly shown in FIGS. 5 and 6, the carrier brackets 22 are received over the top reference surface 16 at either end. The carrier brackets 22 can be formed from a thermosetting resin, such as an epoxy resin, a phenolic resin, or other thermosetting resins understood by those skilled in the art. The carrier brackets 22 are formed as a precision molded part using molding techniques known to those skilled in the art. Although precision tolerances required for molding the carrier bracket are high, these tolerances are not as high as those tolerances required when forming the top and side reference surfaces 16, 18 on the substrate 12 using semiconductor masking and photolithography techniques.

Figure 7:
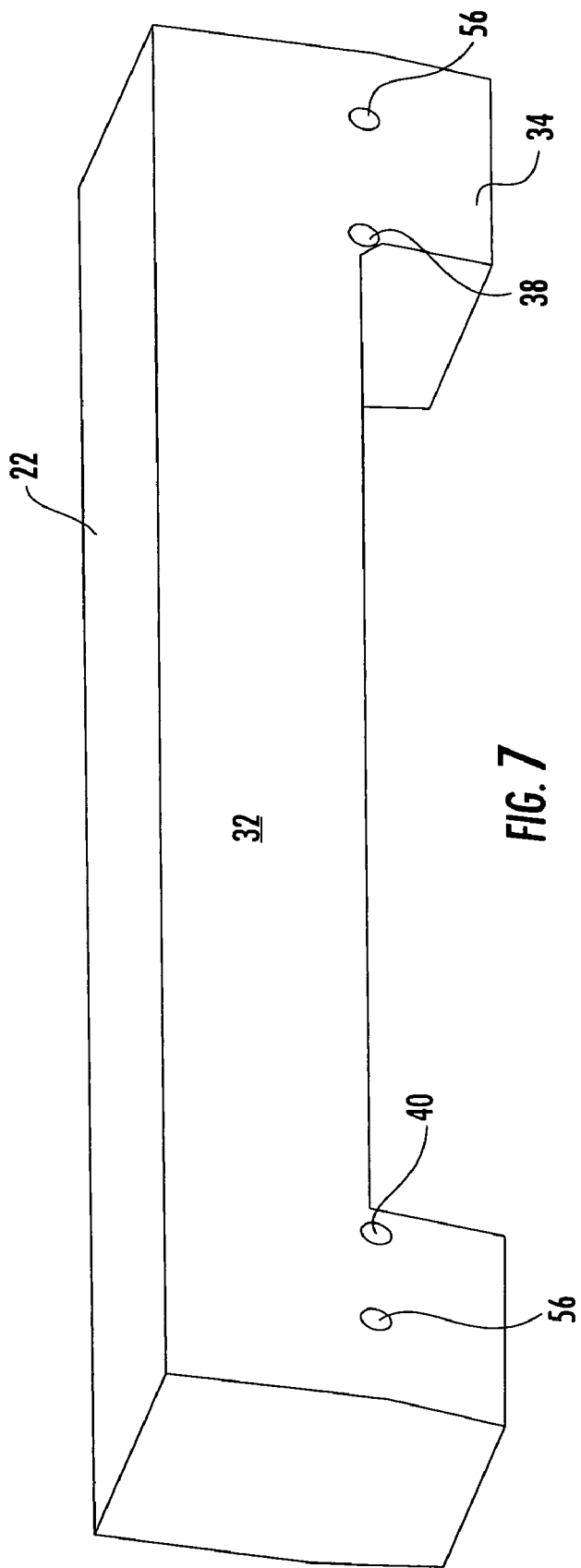
FIG. 7 is an enlarged isometric view of one the carrier brackets as shown in FIG. 2.
Figure 8:
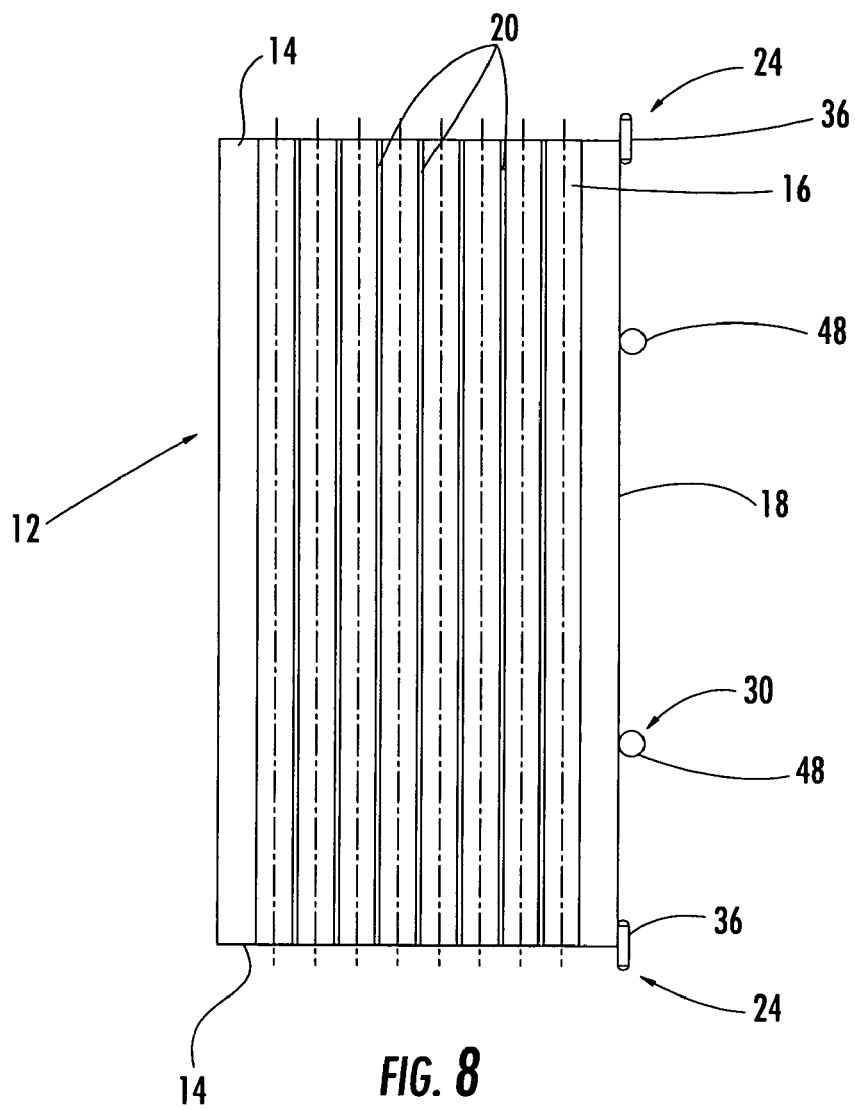
FIG. 8 is a top plan view of the substrate as shown in FIG. 2.
Figure 9:
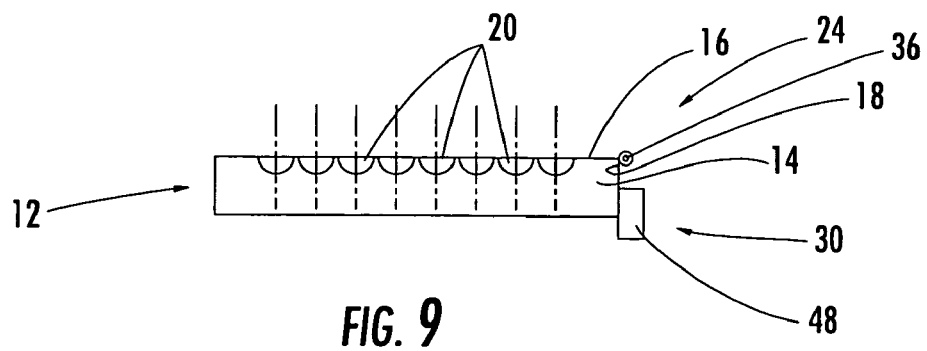
FIG. 9 is an end elevation view of the substrate illustrated in FIG. 8.
Figure 10:
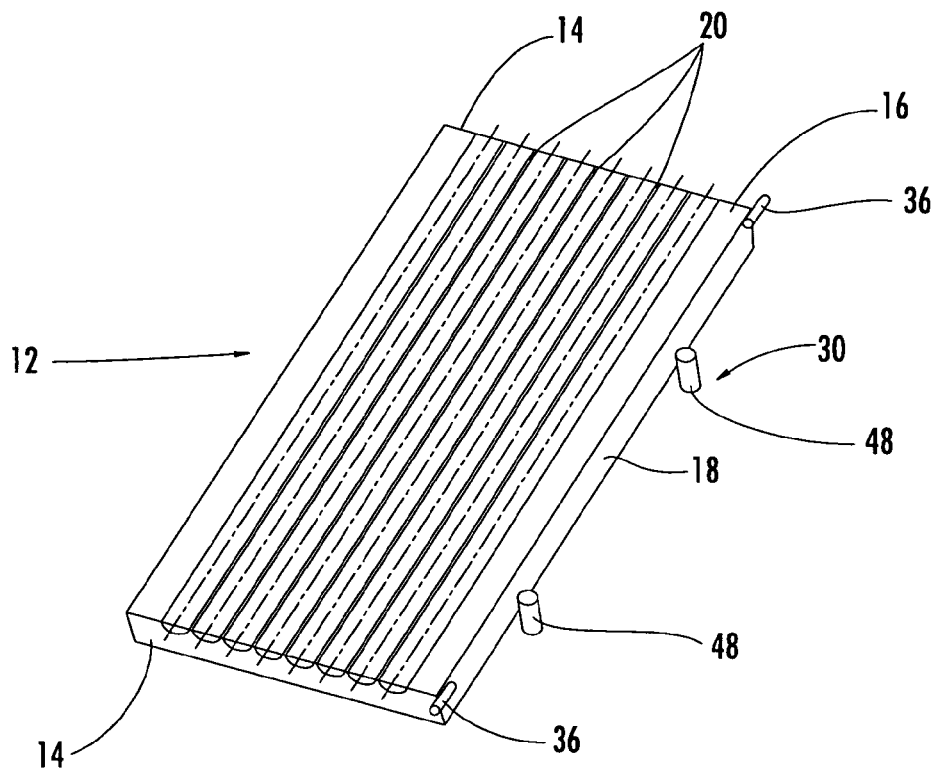
FIG. 10 is a perspective view of the substrate illustrated in FIG. 8.

The carrier bracket 22 may be formed as a truncated, inverted "U" with a horizontally extending top lateral support 32 and two, short, stub legs 34 depending at its ends therefrom, as best shown in FIG. 7. Substrate alignment fiducials 24 form data references for aligning the top and side reference surfaces 16, 18. In a preferred aspect of the present invention, the fiducials 24 include an alignment pin 36 received within a precisely arranged, interior guide hole 38 formed by precision molding or drilling at the inside corner of the lateral support 32 and one leg 34.

For clarity, the guide holes 38 at the rear of various drawing FIGS. 2, 3, 6 and 7 are shown without the received alignment pin. The alignment pin 36 is positioned tangent to the top and side reference surfaces 16, 18 when the carrier bracket 22 is received over the top reference surface. This is clearly shown in FIGS. 10-11 where the alignment pin 36 is shown to engage an edge defined by the top and side reference surfaces 16 and 18, for precisely aligning the side end top reference surfaces, and thus the optical waveguides 20 relative to the known, molded or drilled location of the guide hole 38 and alignment pin 36.

FIG. 7 illustrates in detail position of the guide hole 38 at the formed corner, which is positioned to receive an alignment pin 36 such that reference surfaces 16, 18 would be tangent, i.e., the alignment pin is placed at the edge defined by the two surfaces. Another interior guide hole 40 is spaced a predetermined and precise amount from the initial guide hole 38 containing the alignment pin 36 at the other stub leg 34. This guide hole 40 could also be set at an edge defined between the top and an opposite side reference surface, but this is not necessary since only one side is mandated as the precise reference surface as described above. Alignment pin 41 is received in guide hole 40, as illustrated in FIG. 2. The two interior guide holes 38, 40 receive the alignment pins that are later used for interconnection into a multichannel waveguide device 62, as shown in FIG. 5.

FIG. 3 illustrates how the carrier subassembly 26 that is formed from the substrate 12 and carrier brackets 22 are received within the substrate carrier 28, which also includes carrier alignment fiducials 30 for aligning the side reference surface 18 of the waveguide substrate 12 into a predetermined position, and thus aiding in aligning the connection points of any optical fiber 20 received within the channels 13 on the top reference surface 16 with a multichannel waveguide device 62 connected thereto.

The substrate carrier 28 can also be formed from a thermosetting plastic material, such as an epoxy resin, phenolic resin or other similar thermosetting plastic resin. The substrate carrier 28 is also a precisely molded part and includes a bottom surface 44 having two guide holes 46 containing alignment pins 48 that function as a carrier alignment fiducials 30 on which the side reference surface 18 of the waveguide substrate 12 engages.

The device openings 42 are rectangular configured and include attachment tabs 50 having guide holes 52 that are formed in linear alignment with guide holes 46 and alignment pins 48 positioned in the bottom surface 44 of the substrate carrier. The guide holes 52 on the attachment tabs 50 receive alignment pins 54 within outer guide holes 56 also formed on the carrier bracket 22 so that the carrier bracket will be aligned relative to the substrate carrier 28.

It is thus evident that a waveguide device 62 can be snapped into the optical connector adapter 10 of the present invention via the inner guide pins that are used to align the top and side reference surfaces 16, 18 and via the corner bracket substrate carrier 28. This unique optical connector adapter 10 facilitates passive alignment and interfaces waveguide devices without extensive alignment steps.

As best illustrated in FIGS. 2 and 3, the substrate 12 and carrier brackets 22 have substantially coplanar front edges. The alignment of the various pins allows self-centering of the components relative to each and most importantly, relative to the top and side reference surfaces 16, 18. Spring clips or other retention clips known to those skilled in the art can be used to retain the optical connector adapter to any multichannel waveguide device.

The precision tolerances defined for the two surfaces 16, 18 are set by the semiconductor masking and photolithography selected by those skilled in the art, as well as the tolerances associated with the fiber channels. This allows alignment of components at submicron levels together with the top and side reference surfaces 16, 18.

Referring now to FIGS. 12-18, the optical coupler 64 will be discussed in greater detail. The optical coupler 64 is received over the substrate carrier 28, and focuses and redirects optical energy supplied by optical pump sources 74 into the respective optical waveguides 20 in the substrate 12.

An upper surface 79 of the substrate carrier 28 is immediately adjacent a lower surface 82 of the optical coupler 64 when joined together. Alignment of the optical coupler 64 relative to the optical waveguides 20 is accomplished by a coupler alignment fiducial 66. In the illustrated embodiment, the coupler alignment fiducial 66 is an edge surface extending or protruding from the optical coupler 64, and extends outwards from the lower surface 82.

The illustrated optical coupler 64 and coupler alignment fiducial 66 are formed as one unit, however, they may also be formed as separate units as readily appreciated by those skilled in the art. They may be formed from a thermosetting resin, such as an epoxy resin, a phenolic resin, or other thermosetting resins suggested by those skilled in the art. The optical coupler 64 and the coupler alignment fiducial 66 may also be formed as a precision molded part using molding techniques known to those skilled in the art. Although precision tolerances required for molding the optical coupler 64 and the coupler alignment fiducial 66 are high, these tolerances are not as high as those tolerances required when forming the top and side reference surfaces 16, 18 on the substrate 12 using semiconductor masking and photolithography techniques.

When the optical coupler 64 is received by the substrate carrier 28, the coupler alignment fiducial 66 is immediately adjacent, i.e., it abuts, the side reference surface 18 of the substrate 12. To further aid in the alignment of the optical coupler 64 relative to the optical waveguides, the length of the coupler alignment fiducial 66 is such that the protruding edge surface is boxed in by the carrier alignment pins 48.

In lieu of using the carrier alignment pins 48, a new set of pins may be similarly added. Of course, the length of the coupler alignment fiducial 66 would be adjusted accordingly with respect to the new set of pins. The coupler alignment fiducial 66 extends from the optical coupler 64 so that it comes in contact with the side reference surface 18, but without contacting the bottom surface 44 of the substrate carrier 28.

Figure 15:
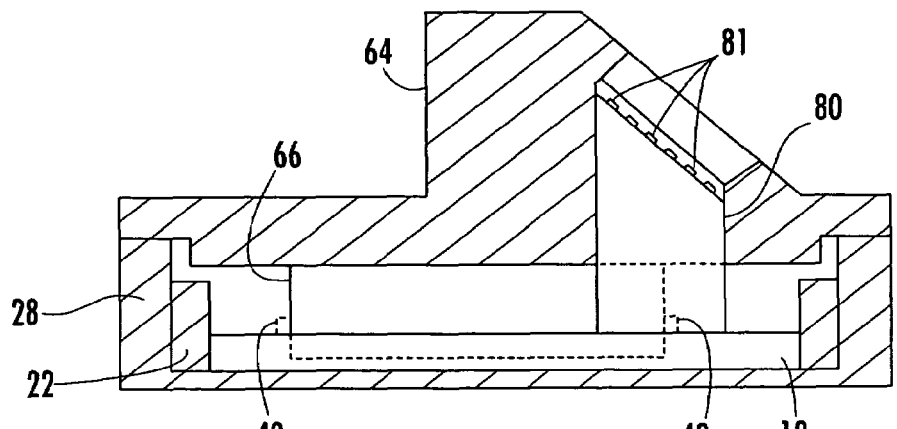
FIG. 15 is a partial crosssectional side view showing a first, GRIN lens-coupled embodiment of the optical coupler in accordance with the present invention.

In one embodiment, the optical coupler 64 comprises a prism 80 and GRINS lens-coupled elements 81 for focusing and redirecting optical energy supplied by the optical pump sources 74 into the respective optical waveguides 20 in the substrate 12, as best illustrated in FIG. 15. The prism 80 is held in place within the optical coupler 28 using a bracket type assembly (not shown), as readily appreciated by those skilled in the art. Of course, other means for holding the prism 80 in place are also acceptable. The optical coupler 28 has an opening 43 that is rectangular configured and includes attachment tabs 51 having guide holes that receive alignment pins 55 for interfacing with optical pump sources 74 via an MTP connector 62.

The prism 80 extends across the substrate 12 so that it extends across the optical waveguides 20. The prism 80 directs spatially adjacent (e.g., parallel) beams of optical energy into the respective optical waveguides 20 in the substrate 12 from a direction that is generally transverse to the waveguides. By optically transverse is meant in a direction that forms an acute angle with the direction of an optical waveguide 20, and is typically greater than zero and less than or equal to 90°.

As a non-limiting example, the pumping energy sources 74 may comprise a 1×N (one-dimensional), or M×N (two-dimensional) array of diode-laser emitter elements, such as but not limited to edge-emitting laser diodes, vertical cavity surface emitting laser (VCSEL) elements, and the like. While a 1×N array of pumping energy sources may be sufficient, an M×N array is preferred, since a two dimensional array provides additional power using lower cost components, as well as providing redundant pumping sources for each optical waveguide 20.

For the materials and parameters of the multichannel optical waveguide amplifier of the present example, each pumping source element may be operative to generate a nominal 980 nm output optical beam that is readily absorbed by Yb/Er doped material of the waveguide 20, so as to produce therein the desired stimulated emission of (1550 nm) photons for amplifying the (nominal 1550 nm) optical signal being transported therethrough.

Because the optical signals from the array of pumping energy emitters 74 diffract or spread and propagate generally transverse to the axes of the optical waveguide 20, it is necessary to focus and redirect the pumping energy of each emitted beam, so that the output of each pumping element is optimally coupled into only its associated optical waveguide 20.

Still referring to FIG. 15, an M×N array of GRIN lens-coupled elements 81 are distributed over (e.g., directly etched into or provided on a separate light transmissive layer that is attached to) a receiving surface of the prism 80. Each GRIN lens-coupled element 81 focuses its associated pumping energy beam along a prescribed refraction path through the bulk material of the prism 80 and onto a generally planar surface of the prism that directly abuts the top reference surface 16 of the substrate 12. The parameters of the focusing elements and the geometry and refractive index of the prism 80 are defined such that each focused pumping beam emerges from the prism surface in a direction through the optical waveguide 20 that effectively redirects and confines the pumping beam therein.

Because each pumping beam for a respective channel is refracted through the prism-waveguide interface, it emerges from that surface and couples into its associated optical waveguide 20 at a respectively different angle. The coupling angle for each pumping energy beam entering the optical waveguide 20 from the prism element 80 is such that the pumping energy is confined to the channel, and undergoes multiple reflections, as it repeatedly passes back and forth between the cladding layer 63 and the signal-transporting core 61, where the pump energy is absorbed, during its propagation along the channel (FIG. 4*a*).

As pointed out above, as the energy in the 980 nm pumping beam 72 is absorbed by the doped Yb/Er glass of the channel, the photonically stimulated energy state transfer properties of the channel material provide emitted radiation-stimulated amplification of the 1550 nm signal beam propagating through the channel core 61. For the parameters of the present example, which include a standard input signal wavelength of 1550 nm and a pumping energy wavelength of 980 nm, a substrate length on the order of four to eight centimeters has been found to provide both amplification of an optical signal beam by the energy contained in its associated pumping beams, as well as a relatively compact form factor in the lengthwise direction of the optical connector adapter 10.

Figure 16:
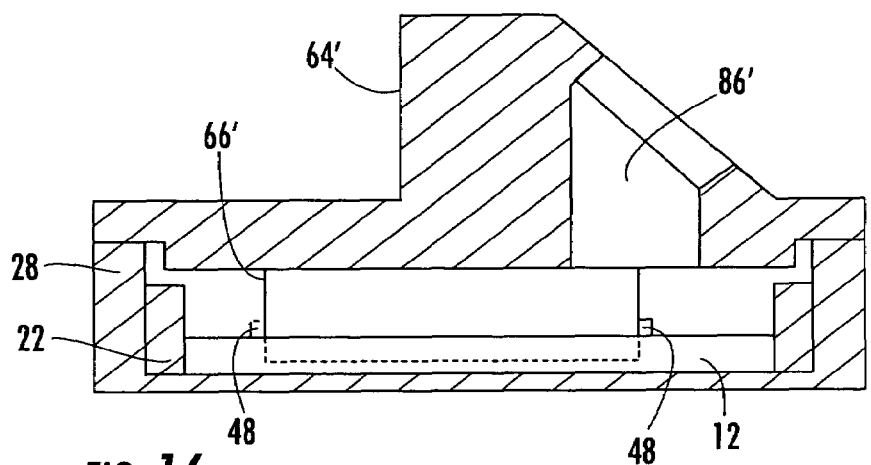
FIG. 16 is a partial crosssectional side view showing a second, prism-coupled embodiment of the optical coupler in accordance with the present invention.

A second prism embodiment 86' of the optical coupler 64' is illustrated in FIG. 16. As in the first embodiment, a pumping energy coupling interface is configured to focus spatially adjacent beams of optical pumping energy generated by an array of pumping energy sources 74 into the respective amplifying optical waveguides 20 from a direction transverse to the channels. Except for the use of a prism and associated micro-lens array as the coupling interface, the remainder of the structure of the second embodiment is the same as that of the first embodiment.

Figure 17:
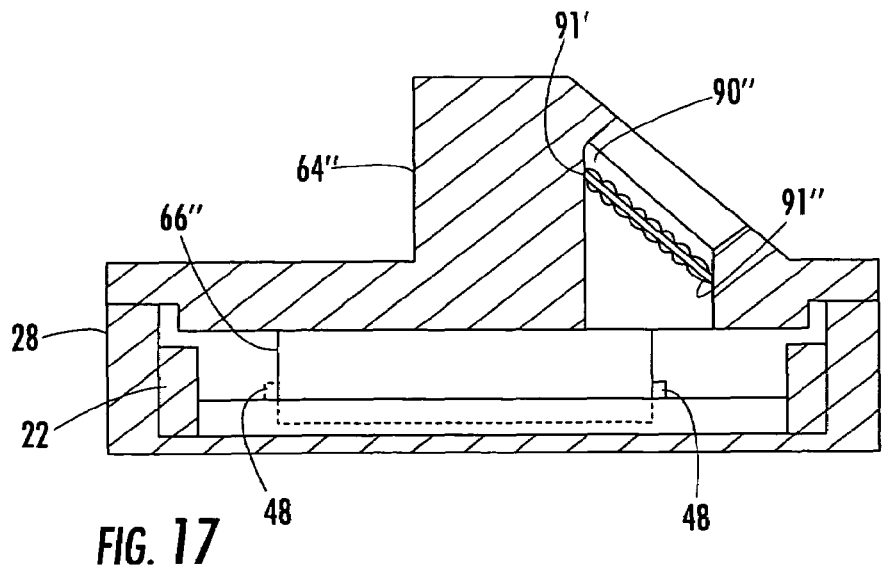
FIG. 17 is a partial cross-sectional side view showing a third, (spherical) lenslet array-coupled embodiment of the optical coupler in accordance with the present invention.

A third embodiment (spherical) lenslet array-coupled embodiment 90" of the optical coupler 64" is diagrammatically illustrated in FIG. 17. In the third embodiment, the prism and (DOE) focusing lens array of the first embodiment are replaced by an array 90" of lenslets, such as spherical lenslets. The lenslet array 90" may be supported by a mounting fixture or other equivalent mounting means (not shown), as readily appreciated by those skilled in the art.

The number of lenslets of the array 90" preferably corresponds to the number of pumping source elements 74, so that there is a one-for-one focusing of the light beams generated by the pumping energy emitters 74 into the optical waveguides 20.

Like the previous embodiments, the lenslet array 90" of diffractive optic elements (DOE) causes each pumping beam to be focused into a respective optical waveguide 20 in a direction that effectively confines the injected pumping beam within the optical waveguide during its propagation through the waveguide, so that the energy in the pumping beam will be transferred to and thereby amplify the signal beam, as the injected pumping beam repeatedly passes back and forth between the cladding layer 63 and the signal-transporting core 61.

Figure 18:
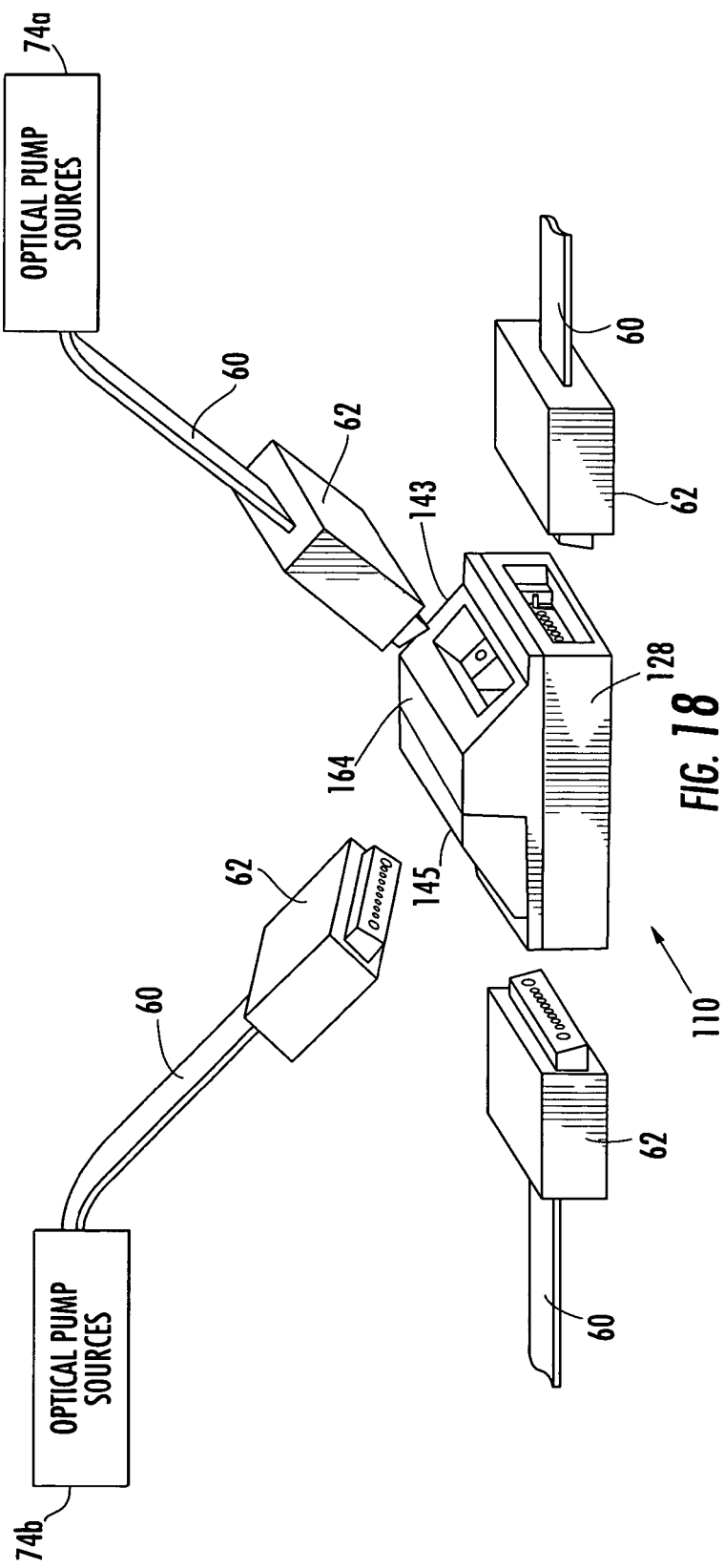
FIG. 18 is a perspective view of another embodiment of optical connector adapter in accordance with the present invention along with optical pump sources and waveguide devices to be connected thereto.

Another embodiment of the optical connector adapter is illustrated in FIG. 18, indicated by reference 100, in which the optical connector adapter is configured for interfacing with more than one optical pump source 74a, 74b for each optical waveguide. The optical coupler 128 has a first input 143 for interfacing a first set of optical pump sources 74a, and a second input 145 for interfacing a second set of optical pump sources 74b. Each interface has associated therewith a respective prism element, GRIN lens array or lenslet array as discussed above for focusing and directing optical energy into the optical waveguides.

The optical pump sources 74a, 74b are used for pumping optical signals from both opposing ends of the substrate. This allows for a better distribution of the absorption of the light through the optical waveguides. In other words, better gain is provided when the optical waveguides receive optical signals in the forward and reverse direction, as readily appreciated by those skilled in the art.

Another aspect of the present invention is directed to a method of forming an optical connector adapter comprising forming a substrate comprising at least one optical waveguide for transporting optical signals. The substrate has opposing ends, and a top reference surface and a side reference surface aligned relative to the at least one optical waveguide.

The method further includes positioning a respective carrier bracket over each end of the substrate and aligning the carrier brackets relative to the substrate using respective substrate alignment fiducials. The substrate having the carrier brackets thereon is inserted into a substrate carrier. The substrate carrier and the carrier brackets are aligned using respective carrier alignment fiducials. The method includes positioning an optical coupler on the substrate carrier and aligning the optical coupler relative to the substrate carrier using at least one coupler alignment fiducial so that the optical coupler is aligned relative to the at least one optical waveguide.

As will be appreciated from the foregoing description, shortcomings of conventional, individual fiber-dedicated light amplifiers are effectively obviated by the multi-fiber ribbon-interfaced optical amplifier architecture of the invention, which is configured to provide one-for-one coupling to each of the optical fibers 60 of a multi-fiber ribbon with a plurality of spatially adjacent optical fibers, or channeled waveguide amplifier channels 20 of a reduced form factor integrated assembly. Associated with the waveguide channels 20 is a physically compact, focusing structure 64, that is configured to direct optical outputs from an array of pumping energy sources 74 into the optical waveguides 20 from a direction generally transverse to the waveguide channels.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. An optical connector adapter comprising:
   a substrate comprising at least one optical waveguide for transporting optical signals, said substrate having opposing ends between which the at least one optical waveguide extends, and a top reference surface and a side reference surface aligned relative to said at least one optical waveguide, the top reference surface and side reference surface extending between the opposing ends of said substrate;
   a respective carrier bracket received over each end of said substrate;
   respective substrate alignment fiducials for aligning said carrier brackets relative to said substrate;
   a substrate carrier that receives said substrate and carrier brackets;
   respective carrier alignment fiducials for aligning said substrate carrier and said carrier brackets;
   an optical coupler received on the top reference surface of said substrate for coupling with said at least one optical waveguide; and
   at least one coupler alignment fiducial for aligning said optical coupler relative to said substrate so that said optical coupler is aligned relative to said at least one optical waveguide.

2. An optical connector adapter according to claim 1, wherein said optical coupler comprises at least one input for interfacing with at least one optical pump source so that the optical signals being transported through said at least one optical waveguide are amplified.

3. An optical connector adapter according to claim 2, wherein the at least one optical pump source includes a forward direction optical pump source and a reverse direction optical pump source for said at least one optical waveguide; and wherein the at least one input comprises a first input for interfacing with the forward direction optical pump source and a second input for interfacing with the reverse direction optical pump source.

4. An optical connector adapter according to claim 1, wherein said substrate comprises a substrate holder having at least one groove formed within the top reference surface for receiving said at least one optical waveguide.

5. An optical connector adapter according to claim 4, wherein said at least one optical waveguide comprises an optical fiber.

6. An optical connector adapter according to claim 5, wherein said optical fiber comprises a core surrounded by cladding, and wherein said core comprises doped erbium ytterbium phosphate glass.

7. An optical connector adapter according to claim 4, wherein said substrate holder comprises at least one of silicon, glass, a molded silica resin composite and ceramic.

8. An optical connector adapter according to claim 1, wherein said substrate comprises a waveguide substrate, with said at least one optical waveguide being implanted within the top reference surface of said substrate.

9. An optical connector adapter according to claim 1, wherein said substrate comprises a semiconductor waveguide substrate, with said at least one optical waveguide comprising silica deposited on the top reference surface of said substrate.

10. An optical connector adapter according to claim 1, wherein each substrate alignment fiducial comprises an alignment pin at an edge defined by the top and side reference surfaces, and is positioned within a corresponding guide hole in said carrier bracket.

11. An optical connector adapter according to claim 1, wherein each carrier alignment fiducial comprises an alignment pin extending outward from said carrier bracket, and is positioned within a corresponding guide hole in said substrate carrier.

12. An optical connector adapter according to claim 1, wherein said at least one coupler alignment fiducial is a side surface extension extending from said optical coupler, and is in contact with the side reference surface of said substrate.

13. An optical connector adapter according to claim 1, wherein said optical coupler comprises at least one input for receiving optical signals from a direction that is generally traverse with respect to said at least one optical waveguide.

14. An optical connector adapter according to claim 1, wherein said optical coupler comprises at least one input for receiving optical signals, and comprises a prism for focusing the optical signals into said at least one optical waveguide.

15. An optical connector adapter according to claim 14, wherein said optical coupler further comprises an array of diffractive optic elements on a surface of said prism receiving the optical signals.

16. An optical connector adapter according to claim 1, wherein said optical coupler comprises at least one input for receiving optical signals, and comprises an array of lenslets for focusing the optical signals into said at least one optical waveguide.

17. An optical connector adapter according to claim 1, wherein said optical coupler comprises at least one input for receiving optical signals, and comprises a GRIN lens for focusing the optical signals into said at least one optical waveguide.

18. An optical connector adapter comprising:
a substrate having at least one groove formed within a top reference surface for receiving at least one optical fiber, the at least one optical fiber for transporting optical signals, said substrate having opposing ends between which the at least one optical fiber extends, and a top reference surface and a side reference surface aligned relative to said at least one optical fiber, the top reference surface and side reference surface extending between the opposing ends of said substrate;
a respective carrier bracket received over each end of said substrate;
respective substrate alignment fiducials for aligning said carrier brackets relative to said substrate;
a substrate carrier that receives said substrate and carrier brackets;
respective carrier alignment fiducials for aligning said substrate carrier and said carrier brackets;
an optical coupler received on the top reference surface of said substrate for coupling with the at least one optical fiber; and
at least one coupler alignment fiducial for aligning said optical coupler relative to said substrate so that said optical coupler is aligned relative to the at least one optical fiber.

19. An optical connector adapter according to claim 18, wherein said optical coupler comprises at least one input for interfacing with at least one optical pump source so that optical signals being transported through said at least one optical fiber are amplified.

20. An optical connector adapter according to claim 18, wherein said at least one optical fiber comprises a core surrounded by cladding, and wherein said core comprises doped erbium ytterbium phosphate glass.

21. An optical connector adapter according to claim 18, wherein said substrate comprises at least one of silicon, glass, a molded silica resin composite and ceramic.

22. An optical connector adapter according to claim 18, wherein each substrate alignment fiducial comprises an alignment pin at an edge defined by the top and side reference surfaces, and is positioned within a corresponding guide hole in said carrier bracket.

23. An optical connector adapter according to claim 18, wherein each carrier alignment fiducial comprises an alignment pin extending outward from said carrier bracket, and is positioned within a corresponding guide hole in said substrate carrier.

24. An optical connector adapter according to claim 18, wherein said at least one coupler alignment fiducial is a side surface extension extending from said optical coupler, and is in contact with the side reference surface of said substrate.

25. An optical connector adapter according to claim 18, wherein said optical coupler comprises at least one input for receiving optical signals, and comprises a prism and an array of diffractive optic elements on a surface of said prism for focusing the optical signals into said at least one optical fiber.

26. An optical connector adapter according to claim 18, wherein said optical coupler comprises at least one input for receiving optical signals, and comprises an array of lenslets for focusing the optical signals into said at least one optical fiber.

27. An optical connector adapter according to claim 18, wherein said optical coupler comprises at least one input for receiving optical signals, and comprises a GRIN lens for focusing the optical signals into said at least one optical fiber.

28. A method of forming an optical connector adapter comprising:
forming a substrate comprising at least one optical waveguide for transporting optical signals, the substrate having opposing ends between which the at least one optical waveguide extends, and a top reference surface and a side reference surface aligned relative to the at least one optical waveguide, the top reference surface and side reference surface extending between the opposing ends of said substrate;
positioning a respective carrier bracket over each end of the substrate and aligning the carrier brackets relative to the substrate using respective substrate alignment fiducials;
inserting the substrate having the carrier brackets thereon into a substrate carrier, and aligning the substrate carrier and the carrier brackets using respective carrier alignment fiducials; and
positioning an optical coupler on the top reference surface of the substrate for coupling with the at least one optical waveguide, and aligning the optical coupler relative to the substrate using at least one coupler alignment fiducial so that the optical coupler is aligned relative to the at least one optical waveguide.

29. A method according to claim 28, wherein the optical coupler comprises at least one input for interfacing with at least one optical pump source so that the optical signals being transported through the at least one optical waveguide are amplified.

30. A method according to claim 28, wherein the at least one optical pump source includes a forward direction optical pump source and a reverse direction optical pump source for the at least one optical waveguide; and wherein the at least one input comprises a first input for interfacing with the forward direction optical pump source and a second input for interfacing with the reverse direction optical pump source.

31. A method according to claim 28, wherein forming the substrate comprises forming a substrate holder having at least one groove formed within the top reference surface for receiving the at least one optical waveguide.

32. A method according to claim 31, wherein the at least one optical waveguide comprises an optical fiber.

33. A method according to claim 32, wherein the optical fiber comprises a core surrounded by cladding, and wherein the core comprises doped erbium ytterbium phosphate glass.

34. A method according to claim 31, wherein the substrate holder comprises at least one of silicon, glass, a molded silica resin composite and ceramic.

35. A method according to claim 28, wherein forming the substrate comprises forming a waveguide substrate, with the at least one optical waveguide being implanted within the top reference surface of the substrate.

36. A method according to claim 28, wherein forming the substrate comprises forming a semiconductor waveguide substrate, with the at least one optical waveguide comprising silica deposited on the top reference surface of the substrate.

37. A method according to claim 28, wherein each substrate alignment fiducial comprises an alignment pin at an edge defined by the top and side reference surfaces, and is positioned within a corresponding guide hole in the carrier bracket.

38. A method according to claim 28, wherein each carrier alignment fiducial comprises an alignment pin extending outward from the carrier bracket, and is positioned within a corresponding guide hole in the substrate carrier.

39. A method according to claim 28, wherein the at least one coupler alignment fiducial is defined as a side surface extension extending from the optical coupler, and is in contact with the side reference surface of the substrate.

40. A method according to claim 28, wherein the optical coupler comprises at least one input for receiving optical signals from a direction that is generally traverse with respect to the at least one optical waveguide.

41. A method according to claim 28, wherein the optical coupler comprises at least one input for receiving optical signals, and comprises a prism and an array of diffractive optic elements on a surface of said prism for focusing the optical signals into the at least one optical waveguide.

42. A method according to claim 28, wherein the optical coupler comprises at least one input for receiving optical signals, and comprises an array of lenslets for focusing the optical signals into the at least one optical waveguide.

43. A method according to claim 28, wherein the optical coupler comprises at least one input for receiving optical signals, and comprises a GRIN lens for focusing the optical signals into the at least one optical waveguide.

\* \* \* \* \*